No. 772,968. PATENTED OCT. 25, 1904.
W. R. SMITH.
SUPPORT FOR CONVEYER BELTS.
APPLICATION FILED DEC. 26, 1903.
NO MODEL.

Witnesses:
C. W. Pezzetti
E. Batchelder

Inventor:
Wm. R. Smith
by Wright Brown & Quimby
Attys.

No. 772,968. Patented October 25, 1904.

UNITED STATES PATENT OFFICE.

WILLIAM R. SMITH, OF BUFFALO, NEW YORK, ASSIGNOR OF ONE-HALF TO HARRISON D. FOLINSBEE, OF BUFFALO, NEW YORK.

SUPPORT FOR CONVEYER-BELTS.

SPECIFICATION forming part of Letters Patent No. 772,968, dated October 25, 1904.

Application filed December 26, 1903. Serial No. 186,536. (No model.)

*To all whom it may concern:*

Be it known that I, WILLIAM R. SMITH, of Buffalo, in the county of Erie and State of New York, have invented certain new and useful Improvements in Supports for Conveyer-Belts, of which the following is a specification.

This invention relates to means for supporting endless belts, and particularly heavy belts used as conveyers or carriers for coal, ore, &c. The upper stretches of conveyer-belts are supported with their edges raised and their central portions depressed to form a moving trough to laterally confine the material which is being conveyed.

My invention has for its object to provide an antifrictional support for a belt of this character which shall extend practically entirely across the belt and afford a practically continuous support which conforms to the trough shape of the belt and prevents the belt from being strained and worn by uneven flexure and is also adjustable, so that the belt may be depressed at one or both edges to discharge the material supported thereby from the depressed edge or edges without necessarily changing the direction of the belt at the point of discharge.

The invention consists in a belt-support comprising in combination a series of pulleys and means for holding said pulleys in the form of a support which is depressed at its center and raised at its ends to give the belt running over the pulleys a trough shape in cross-section, said means being adjustable to permit the depression of one or both ends of the support and of the corresponding edge or edges of the belt so that the material will slide laterally from the belt by gravitation.

Figure 1:
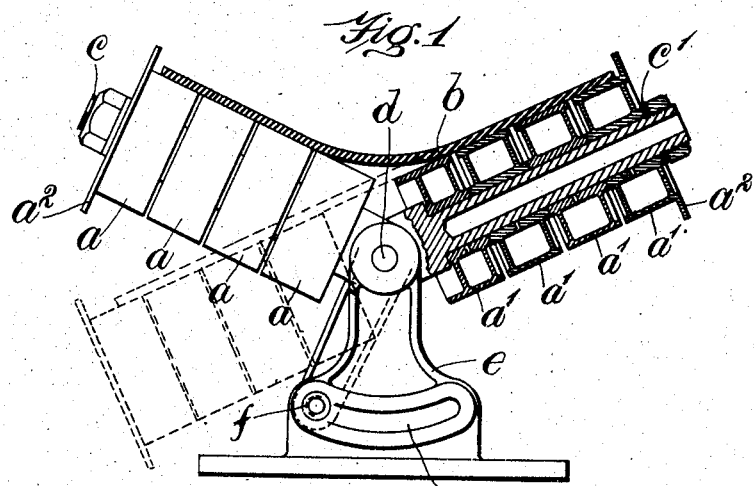
Figure 2:
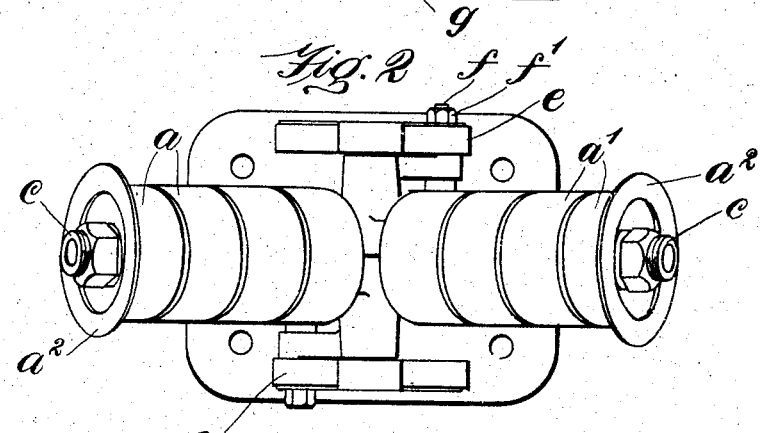
Figure 3:
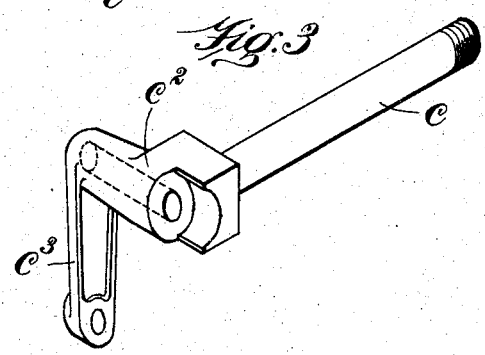

Of the accompanying drawings, forming a part of this specification, Figure 1 represents, partly in section and partly in elevation, a belt-support embodying my invention. Fig. 2 represents a top plan view of the structure shown in Fig. 1. Fig. 3 represents a perspective view of one of the pulley-supporting arms shown in Figs. 1 and 2.

The same reference characters indicate the same parts in all the figures.

In the drawings, $a$ $a$ $a'$ $a'$ represent a series of pulleys which are arranged edge to edge in such manner that their upper surfaces collectively constitute a practically continuous bed which is depressed at its central portion and raised at its end portions, said bed conforming to the natural shape assumed by the dished or trough shaped upper or acting stretch of a conveyer-belt $b$, the cross-section of which is shown in Fig. 1.

$c$ and $c'$ represent two bearing-arms which are adjustably mounted and serve as bearings upon which the pulleys $a$ and $a'$ are adapted to rotate loosely. The adjustability of the arms $c$ is such that each can be inclined upwardly from a central point, thus supporting the pulleys $a$ at a given inclination and the pulleys $a'$ at an opposite inclination, as shown by full lines in Fig. 1. The adjustability of the arms is further such that either arm and the series of pulleys supported thereby may be swung downwardly, as indicated by dotted lines in Fig. 1. It will be seen that when the arms are raised, as shown in full lines, the pulleys thereon give the belt a trough shape in cross-section, its edges being raised and its center depressed, so that it is adapted to confine the material being conveyed by the belt against lateral displacement. When one of the arms is swung downwardly, as indicated by dotted lines, the corresponding edge of the belt is depressed, and the material being carried by the belt is permitted to slide by gravitation from the depressed edge of the belt. In case each of the arms is depressed the material will obviously divide at the center of the belt and slide from both edges thereof. In the embodiment of my invention here shown each arm is provided at its inner end with a hub $c^2$, the hubs of the two arms being rotatably mounted upon a horizontal stud $d$, affixed to ears forming parts of an upright supporting-standard $e$, the hubs being adapted to turn on said stud to permit any desired adjustment of the arms and the pulleys supported thereby. Each hub $c$ is provided with an arm $c^3$, the outer end of which carries a locking-bolt $f$, which passes through a segmental slot $g$ in the supporting-standard and is provided with a clamping-nut $f'$ or other means whereby it may be locked to the standard in various positions for the purpose of holding the corresponding arm and its pulleys at any desired adjustment.

It will be seen from the foregoing that each of the bearing-arms and the pulleys thereon is adapted to swing from the raised position shown in full lines to the depressed position shown in dotted lines in Fig. 1, so that either or both edges of the belt may be depressed and caused to release the material being conveyed.

I do not limit myself to the particular form of adjustable means here shown for holding the pulleys in the form of a support which is depressed at its center and raised at its ends, it being obvious that the construction of said adjustable means may be variously modified without departing from the spirit of my invention. Furthermore, it is obvious that the adjustability may be confined to that portion of the supporting means which supports the belt at one side only of its longitudinal center, the supporting means at the opposite side of said center being fixed or non-adjustable. It is essential, however, that the supporting means shall be such as to permit the belt, as well as the pulleys, to be lowered sufficiently to enable the load to discharge laterally by gravitation, and preferably with such rapidity as to avoid the wearing friction that results from a slow sliding movement.

Any suitable means may be employed for lubricating the bearing-arms and the hub-surfaces of the pulleys running thereon.

The adjustability of the supporting-pulleys may be utilized to regulate the depth of the trough without causing the lateral discharge of the load. For example, when the belt is used for conveying coal which requires inspection and the removal by hand of fragments of slate, &c., the edges of the portions of the belt which are under inspection may be depressed sufficiently to decrease the depth of the trough and permit the width of the layer of coal to be increased and its depth at the center correspondingly decreased without permitting the escape of the load over the edges of the belt. The supports of other portions of the belt which are not under inspection may be at the same time under such adjustment as to give the trough a greater depth.

As clearly shown in Fig. 1, the standard $c$ comprises an upright having the stud $d$ at a sufficient height above the base of said standard or upright to enable either arm to be swung downward and set at such an angle that will give the belt an inclination that will cause the load to automatically discharge laterally by gravitation. Preferably the angle for discharge will be such that the load will move rapidly, so as to avoid the wearing effect upon the belt that would result from a slow sliding movement of such material as coal.

The pulleys at the ends of the series may have flanges $a^2$ at their outer ends to guide the edges of the belt.

I claim—

1. In combination, a series of pulleys, and means for holding said pulleys in the form of a support which is depressed at its center and raised at its ends, to give a belt running over the pulleys a trough shape in cross-section, said means being adjustable to permit the depression of one or both ends of the support and the corresponding edge or edges of the belt, the construction being such as to enable the support to be set at an angle that will permit a rapid discharge by gravitation from said belt.

2. A belt-support comprising two bearing-arms, an upright standard to which said arms are adjustably connected, means for holding said arms in different positions within the range of their adjustability, and belt-supporting pulleys mounted on said arms, the construction being such as to enable the arms to be set at an angle that will permit a rapid discharge by gravitation from said belt.

In testimony whereof I have affixed my signature in presence of two witnesses.

WILLIAM R. SMITH.

Witnesses:
DANIEL W. ALLEN,
J. E. VOORHIS.